(12) United States Patent
Hong

(10) Patent No.: US 11,368,964 B2
(45) Date of Patent: Jun. 21, 2022

(54) DATA TRANSMISSION METHOD, APPARATUS, AND UNMANNED AERIAL VEHICLE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/931,802

(22) Filed: May 14, 2020

(65) Prior Publication Data

US 2020/0280998 A1    Sep. 3, 2020

Related U.S. Application Data

(63) Continuation of application No. PCT/CN2017/112347, filed on Nov. 22, 2017.

(51) Int. Cl.
*H04W 72/08* (2009.01)
*H04B 17/318* (2015.01)
(Continued)

(52) U.S. Cl.
CPC ........ *H04W 72/085* (2013.01); *H04B 17/318* (2015.01); *H04W 4/40* (2018.02);
(Continued)

(58) Field of Classification Search
CPC ....... H04W 88/06; H04W 4/40; H04W 40/12; H04W 72/02; H04W 76/15; H04W 36/14;
(Continued)

(56) References Cited

U.S. PATENT DOCUMENTS 9,681,320 B2   6/2017 Johnson et al.
2013/0165119 A1*  6/2013 Lee ...................... H04W 76/16
455/435.2
(Continued)

FOREIGN PATENT DOCUMENTS

CN    102625410 A    8/2012
CN    105052203 A    11/2015
(Continued)

OTHER PUBLICATIONS

First Office Action of the Chinese application No. number 201780001897.1, dated Sep. 3, 2020.
(Continued)

*Primary Examiner* — Quoc Thai N Vu
(74) *Attorney, Agent, or Firm* — Syncoda LLC; Feng Ma

(57) ABSTRACT

A data transmission method includes: based on signal strengths of a mobile network and a Wi-Fi network accessed by an unmanned aerial vehicle (UAV) accesses, determining a transmission link for data to be transmitted; and sending the data to be transmitted through the transmission link. A UAV is enabled to dynamically adjust, based on the signal strengths of the mobile network and the Wi-Fi network accessed by the unmanned aerial vehicle, the transmission link for sending the data to be transmitted, thus better integrating the resources of the mobile network and the Wi-Fi network accessed by the UAV, and solving the problem that the data transmission performance is caused to be relatively low due to data transmission between the UAV and the UAV controller through the Wi-Fi network in the related art.

12 Claims, 7 Drawing Sheets

(51) Int. Cl.
*H04W 4/40* (2018.01)
*H04W 48/18* (2009.01)
*H04W 84/04* (2009.01)
*H04W 88/06* (2009.01)
*H04W 88/12* (2009.01)

(52) U.S. Cl.
CPC .......... *H04W 48/18* (2013.01); *H04W 84/042* (2013.01); *H04W 88/06* (2013.01); *H04W 88/12* (2013.01)

(58) Field of Classification Search
CPC ............. H04W 48/18; H04W 52/0245; H04W 72/085; H04W 76/10; H04W 84/042; H04W 88/12; H04W 36/0088; H04W 36/30; H04B 7/18502; H04B 7/18506; H04B 17/318; H04B 17/382; B64C 2201/027; B64C 2201/146; B64C 39/024; G08C 17/02
See application file for complete search history.

(56) References Cited

U.S. PATENT DOCUMENTS

| | | |
|---|---|---|
| 2015/0230150 A1 | 8/2015 | Wang et al. |
| 2015/0230207 A1 | 8/2015 | Wang et al. |
| 2015/0304869 A1 | 10/2015 | Johnson et al. |
| 2016/0073378 A1 | 3/2016 | Wang et al. |
| 2017/0248947 A1 | 8/2017 | Johnson et al. |
| 2019/0037433 A1* | 1/2019 | Nagasaka ............... H04W 4/70 |
| 2019/0124546 A1* | 4/2019 | Phuyal .................. H04W 72/14 |

FOREIGN PATENT DOCUMENTS

| | | |
|---|---|---|
| CN | 105070017 A | 11/2015 |
| CN | 105142234 A | 12/2015 |
| CN | 105764079 A | 7/2016 |
| CN | 106056875 A | 10/2016 |
| CN | 106851782 A | 6/2017 |
| CN | 107104948 A | 8/2017 |

OTHER PUBLICATIONS

Supplementary European Search Report in the European application No. 17932600.4, dated Sep. 28, 2020.
International Search Report in the international application No. PCT/CN2017/112347, dated Aug. 20, 2018.
English translation of the Written Opinion of the International Search Authority in the international application No. PCT/CN2017/112347, dated Aug. 20, 2018.
Second Office Action of the Chinese application No. 201780001897.1, dated Apr. 15, 2021.

* cited by examiner

DATA TRANSMISSION METHOD, APPARATUS, AND UNMANNED AERIAL VEHICLE

CROSS-REFERENCE TO RELATED APPLICATION

This application is a continuation of International Application No. PCT/CN2017/112347 filed on Nov. 22, 2017, the disclosure of which is hereby incorporated by reference.

BACKGROUND

Unmanned aerial vehicle (UAV) has been applied to some specific scenarios and can carry out tasks such as aerial photographing, unmanned detection and reconnaissance, surveying and mapping, highway survey, urban planning, ecological and environmental monitoring, scientific investigation, oil exploration, aerial remote sensing, border patrol, forest fire prevention, disaster assessment, etc.

SUMMARY

The disclosure relates to the technical field of communications, and more particularly, to a data transmission method and apparatus, and an unmanned aerial vehicle.

According to the first aspect of the embodiments of the disclosure, the disclosure provides a data transmission method which includes:

determining a transmission link for data to be transmitted based on signal strengths of a mobile network and a Wi-Fi network accessed by a UAV; and sending the data to be transmitted through the transmission link.

According to the second aspect of the embodiments of the disclosure, the disclosure provides a UAV. The UAV includes:

a processing component, and a communication component, connected with the processing component and configured to send and receive information under control of the processing component, wherein the processing component is configured to:

determine a transmission link for data to be transmitted based on signal strengths of a mobile network and a Wi-Fi network accessed by the UAV; and control the communication component to send the data to be transmitted through the transmission link.

According to the third aspect of the embodiments of the disclosure, the disclosure provides a non-temporary computer-readable storage medium. The storage medium may have computer instructions stored thereon. When the instructions are executed by the processor, the following steps are implemented, including:

determining a transmission link for data to be transmitted based on signal strengths of a mobile network and a Wi-Fi network accessed by a UAV; and sending the data to be transmitted through the transmission link.

According to the third aspect of the embodiments of the disclosure, a UAV implementing the method according to the first aspect is provided. The UAV is configured to dynamically adjust, based on the signal strengths of the mobile network and the Wi-Fi network accessed, the transmission link for sending the data, thus better integrating resources of the mobile network and the Wi-Fi network accessed by the UAV.

It should be understood that the above general description and the following detailed description are only exemplary and explanatory and shall not limit the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In order to further expand the application scope of UAV, the 3rd Generation Partnership Project (3GPP) proposed a research on enabling the demand-satisfying service provided for a UAV by a cellular network to be more standardized in the discussion of a "UAV enhanced support" project. Data transmission between a UAV and a UAV controller can be usually realized through a Wireless-Fidelity (Wi-Fi) network. The Wi-Fi network may have disadvantages including channel occupation, great interference, limited coverage and the like. Therefore, the performance of data transmission between a UAV and a UAV controller is low. Data transmission based on a cellular network has features such as continuous coverage and guaranteed data transmission. However, no solution has yet been proposed in related art to address how to improve the performance of data transmission between a UAV and a UAV controller through a cellular network and a Wi-Fi network.

Figure 1A:
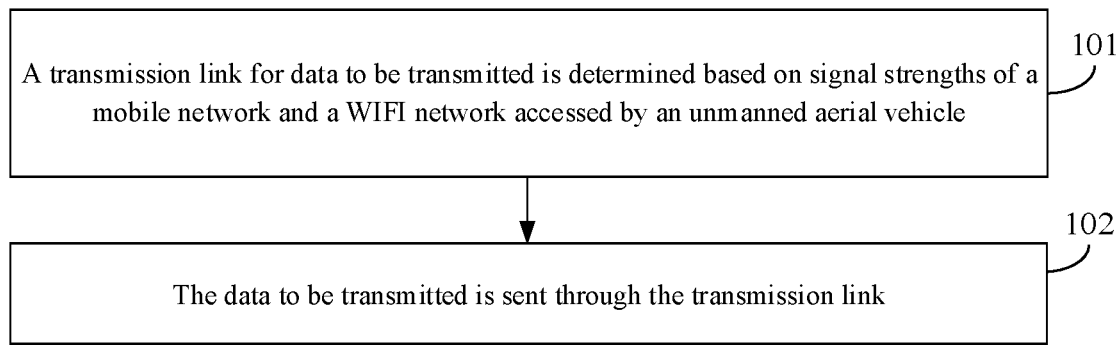
FIG. 1A is a flowchart of a data transmission method according to some embodiments.
Figure 1B:
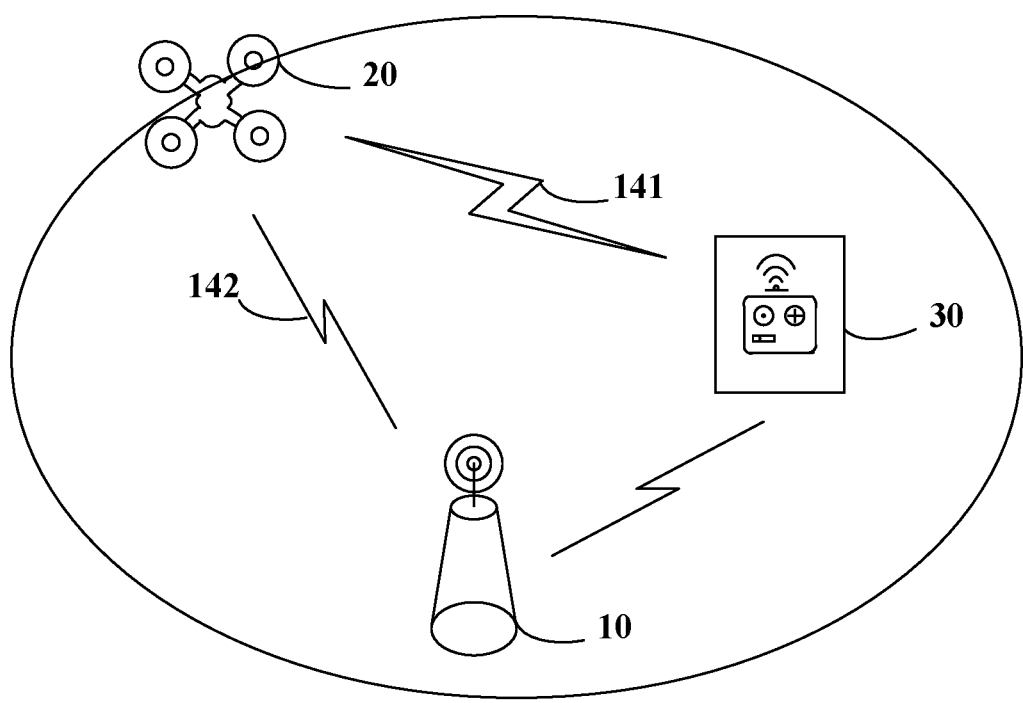
FIG. 1B is a scenario diagram of a data transmission method according to some embodiments.

FIG. 1A is a flowchart of a data transmission method according to some embodiments. FIG. 1B is a scenario diagram of a data transmission method according to some embodiments. The data transmission method may be applied to an Unmanned Aerial Vehicle (UAV). As illustrated in FIG. 1A, the data transmission method includes the following steps 101-102:

In step 101, based on signal strengths of a mobile network and a Wi-Fi network accessed by a UAV, a transmission link for data to be transmitted is determined.

In some embodiments, the UAV may directly send data to a UAV controller through a first link in the Wi-Fi network, or the UAV may send data to a base station through a second link in the mobile network, and then the base station sends the data to the UAV controller.

In some embodiments, the data to be transmitted may be a data packet to be sent to the UAV controller cached in the buffer of a Packet Data Convergence Protocol (PDCP) of the UAV.

In some embodiments, the Wi-Fi network is a free network and the mobile network is a charged network, therefore, when the signal strength of the Wi-Fi network is higher, the first link in the Wi-Fi network may be preferentially determined as the transmission link, while when the signal strength of the Wi-Fi network is lower and the signal strength of the mobile network is higher, both the first link corresponding to the Wi-Fi network and a second link corresponding to the mobile network may be determined as the transmission link or only the second link corresponding to the mobile network is determined as the transmission link. Based on the signal strengths of the mobile network and the Wi-Fi network accessed by the UAV, the description of the embodiments illustrated in FIG. 2 and FIG. 3 may be referred to for the specific implementation mode of determining the transmission link for the data to be transmitted, which is thus not described in detail here.

In step 102, the data to be transmitted is sent through the transmission link.

In some embodiments, after the transmission link for the data to be transmitted is determined, the data to be transmitted may be sent through the transmission link.

In an exemplary scenario, as illustrated in FIG. 1B, exemplary description is made by taking that the mobile network is a Long Term Evolution (LTE) network and the base station is an evolved NodeB (eNB) as an example (the mobile network is not limited to the LTE network, which may also be 5G or other cellular networks). In the scenario illustrated in FIG. 1B, an eNB 10, a UAV 20 and a UAV controller 30 are shown. The UAV 20 is located within the coverage of the eNB 10, and is within the same Wi-Fi network as the UAV controller 30. Based on the signal strengths of the Wi-Fi network and the mobile network, in one case, the UAV 20 may transmit data to the UAV controller 30 through a first link 141 in the Wi-Fi network. When the signal strength of the Wi-Fi network is low, part or all of the data may be transmitted to the eNB 10 through a second link 142 in the mobile network in order to improve the efficiency of data transmission of the UAV 20, and then this part or all of data may be forwarded by the eNB 10 to the UAV controller 30. The efficiency of data transmission between the UAV 20 and the UAV controller 30 is effectively improved.

The mobile network and the Wi-Fi network accessed by the UAV can be two independent communication networks. In the embodiment, through the above steps 101 and 102, the UAV can dynamically adjust, based on the signal strengths of the mobile network and Wi-Fi network accessed by the UAV, the transmission link for the data to be transmitted, thus better integrating the resources of the mobile network and the Wi-Fi network accessed by the UAV, and solving the problem that the data transmission performance is caused to be relatively low due to data transmission between a UAV and a UAV controller through a Wi-Fi network in the related art.

Please refer to the following embodiments for details on how to transmit data.

The technical solution provided by the embodiments of the disclosure will be described below through the following specific embodiments.

Figure 2:
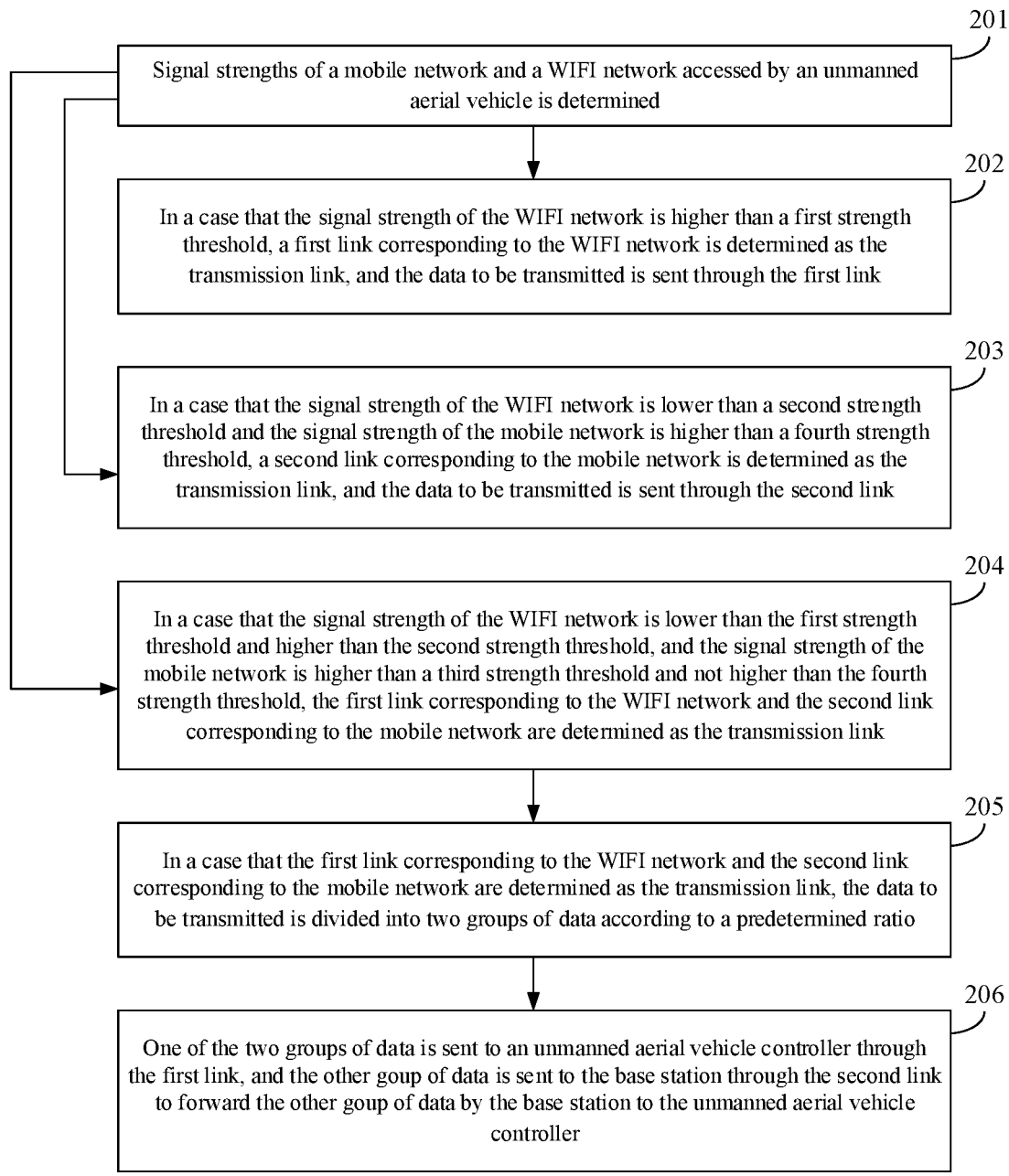
FIG. 2 is a flowchart of another data transmission method according to some embodiments.

FIG. 2 is a flowchart of another data transmission method according to some embodiments. The embodiment is exemplarily described by using the above method provided by the embodiments of the disclosure, taking that the UAV determines the transmission link based on the signal strengths of the mobile network and the Wi-Fi network and transmits the data as an example and referring to FIG. 1B. As illustrated in FIG. 2, the method includes the following steps:

In step 201, the signal strengths of the mobile network and the Wi-Fi network accessed by the UAV are determined, and step 202, step 203 or step 204 is correspondingly executed based on the signal strengths of the mobile network and the Wi-Fi network accessed by the UAV.

In step 202, in a case that the signal strength of the Wi-Fi network is higher than a first strength threshold, the first link corresponding to the Wi-Fi network is determined as the transmission link, the data to be transmitted is sent through the first link, and the process ends.

In some embodiments, the first strength threshold may be a relatively high value. For example, the first strength threshold is −60 dB. When the signal strength of the Wi-Fi network is higher than the first strength threshold, it indicates that the signal quality of the Wi-Fi network is very good and is enough to transmit the service data of the UAV, so only the first link corresponding to Wi-Fi network may be determined as the transmission link.

In step 203, in a case that the signal strength of the Wi-Fi network is lower than a second strength threshold and the signal strength of the mobile network is higher than a fourth strength threshold, a second link corresponding to the mobile network is determined as the transmission link, the data to be transmitted is sent through the second link, and the process ends.

In some embodiments, when the signal strength of the Wi-Fi network is lower than the second strength threshold, it indicates that the signal quality of the Wi-Fi network is relatively poor and the data transmission rate is very low; when the signal strength of the mobile network is higher than the fourth strength threshold, it indicates that the signal quality of the mobile network is very good, so only the second link in the mobile network may be determined as the transmission link, in order to avoid data loss caused by data transmission through the Wi-Fi network.

In step 204, in a case that the signal strength of the Wi-Fi network is lower than the first strength threshold and higher than the second strength threshold, and the signal strength of the mobile network is higher than the third strength threshold and not higher than the fourth strength threshold, the first link corresponding to the Wi-Fi network and the second link corresponding to the mobile network are determined as the transmission link.

In some embodiments, the second strength threshold may be a value smaller than the first strength threshold. For example, the first strength threshold is −80 dB. When the signal strength of the Wi-Fi network is lower than the first strength threshold and higher than the second strength threshold, it indicates that the signal quality of the Wi-Fi network is average and the Wi-Fi network can be used to transmit the service data of the UAV, but the data transmission rate may be relatively low. In some embodiments, the third strength threshold may be a value smaller than the fourth strength threshold. When the signal strength of the mobile network is higher than the third strength threshold and not higher than the fourth strength threshold, it indicates that the signal quality of the mobile network is relatively good. Therefore, in order to improve the data transmission efficiency of the data to be transmitted, the data to be transmitted may be transmitted through the mobile network and the Wi-Fi network at the same time.

In some embodiments, the first strength threshold, the second strength threshold, the third strength threshold and the fourth strength threshold may be set by the base station. In some embodiments, the first strength threshold, the second strength threshold, the third strength threshold and the fourth strength threshold may be set by the UAV controller.

In step 205, in a case that the first link corresponding to the Wi-Fi network and the second link corresponding to the mobile network are determined as the transmission link, the data to be transmitted is divided into two groups of data according to a predetermined ratio.

In some embodiments, the predetermined ratio may be set by the UAV controller. The predetermined ratio may be a fixed value, such as 2:1. The predetermined ratio may also be determined based on the signal strength of the Wi-Fi network and the signal strength of the mobile network. For example, when the signal strength of the Wi-Fi network and the signal strength of the mobile network are equal, the predetermined ratio may be 1:1; when the signal strength of the Wi-Fi network is much higher than the signal strength of mobile network, the predetermined ratio may be 3:1; when the signal strength of the Wi-Fi network is a little bit higher than the signal strength of the mobile network, the predetermined ratio may be 3:2.

In some embodiments, the data to be transmitted may be divided by taking a bit as a unit. For example, the data represented by the first half bits of the data to be transmitted is divided into a first group of data, and the data represented by the second half bits is divided into a second group of data. For example, the first 6 bits of 12 bits may be used as the first group of data, and the last 6 bits may be used as the second group of data.

In step 206, one of the two groups of data is sent to the UAV controller through the first link, and the other group of data is sent to the base station through the second link and then forwarded by the base station to the UAV controller.

In some embodiments, based on the signal strengths of the Wi-Fi network and the mobile network, the one group of data sent to the base station through the second link and the other group of data sent to the UAV controller through the first link can be determined. For example, when the signal strength of the Wi-Fi network is higher than the signal strength of the mobile network, the group with more data may be sent to the UAV controller through the first link.

In one exemplary scenario, as illustrated in FIG. 1B, under the situation that the UAV 20 can access the mobile network and the Wi-Fi network at the same time, if the signal strength of the Wi-Fi network is very good, the first link in the Wi-Fi network may be determined as the transmission link only, so as to reduce the cost in using the mobile network to transmit data; if the signal strength of the Wi-Fi network is average and the signal strength of the mobile network is also average, both the first link corresponding to the Wi-Fi network and the second link corresponding to the mobile network may be determined as the transmission link, so as to ensure that the data of the UAV can be quickly uploaded to the UAV controller. When the signal strength of the Wi-Fi network is relatively low and the signal strength of the mobile network is very good, the second link in the mobile network may be determined as the transmission link, so as to ensure that the UAV 20 can transmit data to the UAV controller 30 through the most suitable transmission link.

In the embodiment, the network used by the UAV may be adjusted according to the signal strengths of the mobile network and the Wi-Fi network, so as to ensure that the UAV can transmit data through the best network, thus effectively improving the performance of the UAV when transmitting data.

Figure 3:
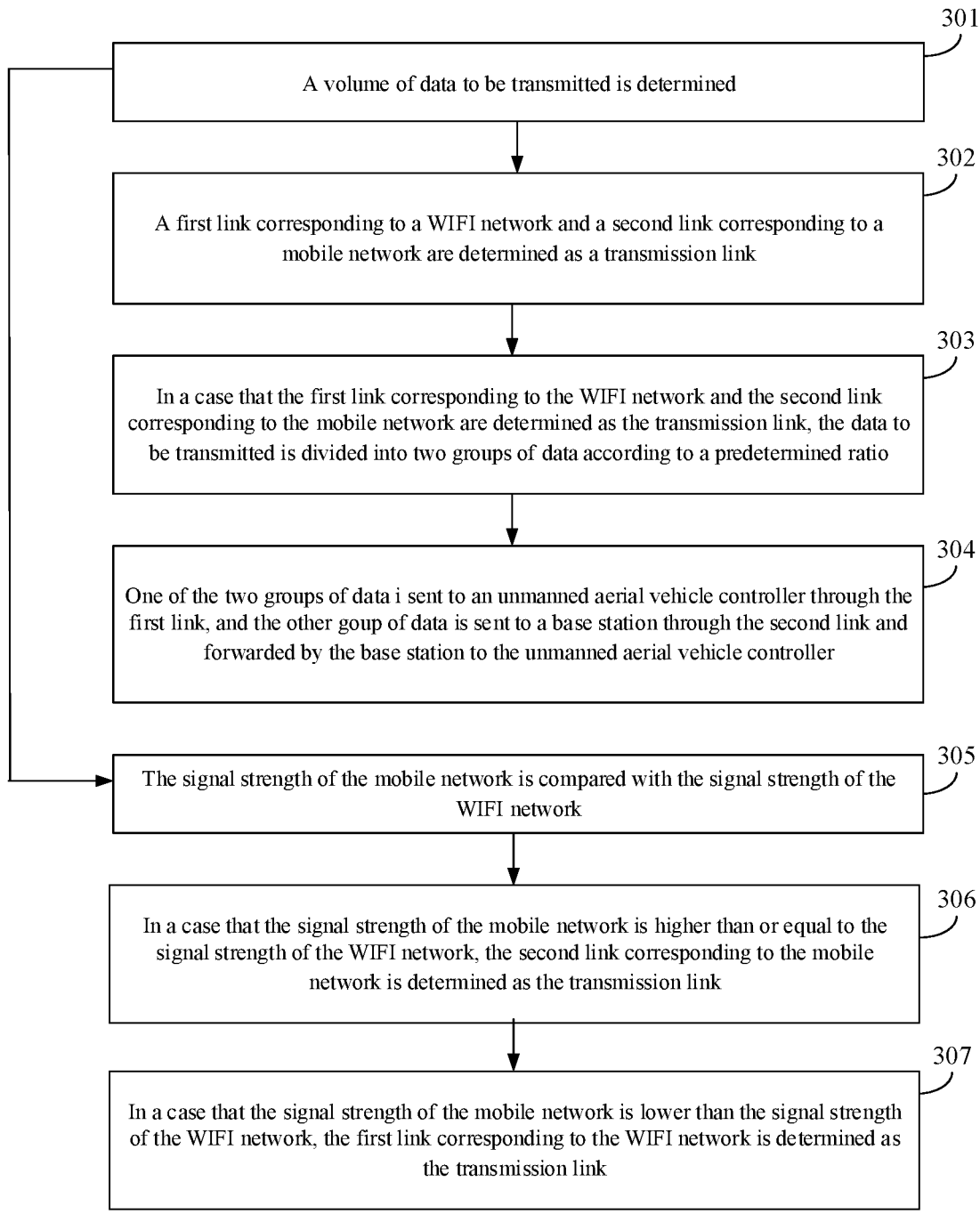
FIG. 3 is a flowchart of another data transmission method according to some embodiments.

FIG. 3 is a flowchart of another data transmission method according to some embodiments. The embodiment is exemplarily described by using the above method provided by the embodiments of the disclosure and taking that the UAV determines the transmission link based on a volume of the data to be transmitted of the UAV and the signal strengths of the mobile network and the Wi-Fi network and transmits the data as an example. As illustrated in FIG. 3, the method includes the following steps:

In step 301, the volume of the data to be transmitted is determined. In a case that the volume of the data to be transmitted is greater than a first volume threshold, step 302 is executed, otherwise, in a case that a volume of the data to be transmitted is not greater than the first volume threshold, step 305 is executed.

In some embodiments, the volume of the data to be transmitted may be obtained based on the volume of data cached in the buffer. For example, the volume is 12 bits. In some embodiments, the first volume threshold may be set by the UAV controller, generally not exceeding the volume of data that the buffer can cache.

In step 302, the first link corresponding to the Wi-Fi network and the second link corresponding to the mobile network are determined as the transmission link.

In some embodiments, when the volume of the data to be transmitted is greater than the first volume threshold, it indicates that the volume of the data to be transmitted of the UAV is relatively great. In order to complete the transmission of the data as soon as possible, the data may be divided into two groups of data, which may be sent through the first link and the second link respectively.

In step 303, in a case that the first link corresponding to the Wi-Fi network and the second link corresponding to the mobile network are determined as the transmission link, the data to be transmitted is divided into two groups of data according to a predetermined ratio.

In step 304, one of the two groups of data is sent to the UAV controller through the first link, and the other group of data is sent to the base station through the second link and then forwarded by the base station to the UAV controller.

In some embodiments, the description of step 205 and step 206 of the embodiment illustrated in FIG. 2 may be referred to for the description of step 303 and step 304, which is thus not described in detail here.

In step 305, the signal strength of the mobile network is compared with the signal strength of the Wi-Fi network. When the signal strength of the mobile network is higher than or equal to the signal strength of the Wi-Fi network, step 306 is executed, otherwise, the signal strength of the mobile network is lower than the signal strength of the Wi-Fi network, step 307 is executed.

In some embodiments, when a volume is smaller than the first volume threshold, it indicates that the data to be transmitted is relatively less, so the data may be transmitted through only one link. Therefore, the signal strength of the mobile network and the signal strength of the Wi-Fi network may be compared, and then the link with better signal quality may be selected for data transmission.

In step 306, the second link corresponding to the mobile network is determined as the transmission link.

In step 307, the first link corresponding to the Wi-Fi network is determined as the transmission link.

In the embodiment, based on the volume of the data to be transmitted, whether to transmit data through one link or two links may be firstly determined. When it is determined to transmit data through one link, the link with better signal quality may be preferentially selected as the transmission link, thus better integrating the resources of a mobile network and a Wi-Fi network accessed by a UAV, solving the problem that the data transmission performance is caused to be relatively low due to data transmission between a UAV and a UAV controller through a Wi-Fi network in the related art, and improving the data transmission performance of the UAV.

Figure 4:
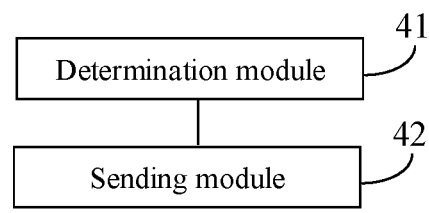
FIG. 4 is a block diagram of a data transmission apparatus according to some embodiments.

FIG. 4 is a block diagram of a data transmission apparatus according to some embodiments. As illustrated in FIG. 4, the data transmission apparatus includes:

a determination module 41 configured to determine, based on signal strengths of a mobile network and a Wi-Fi network accessed by a UAV, a transmission link for data to be transmitted;

a sending module 42 configured to send the data to be transmitted through the transmission link.

Figure 5:
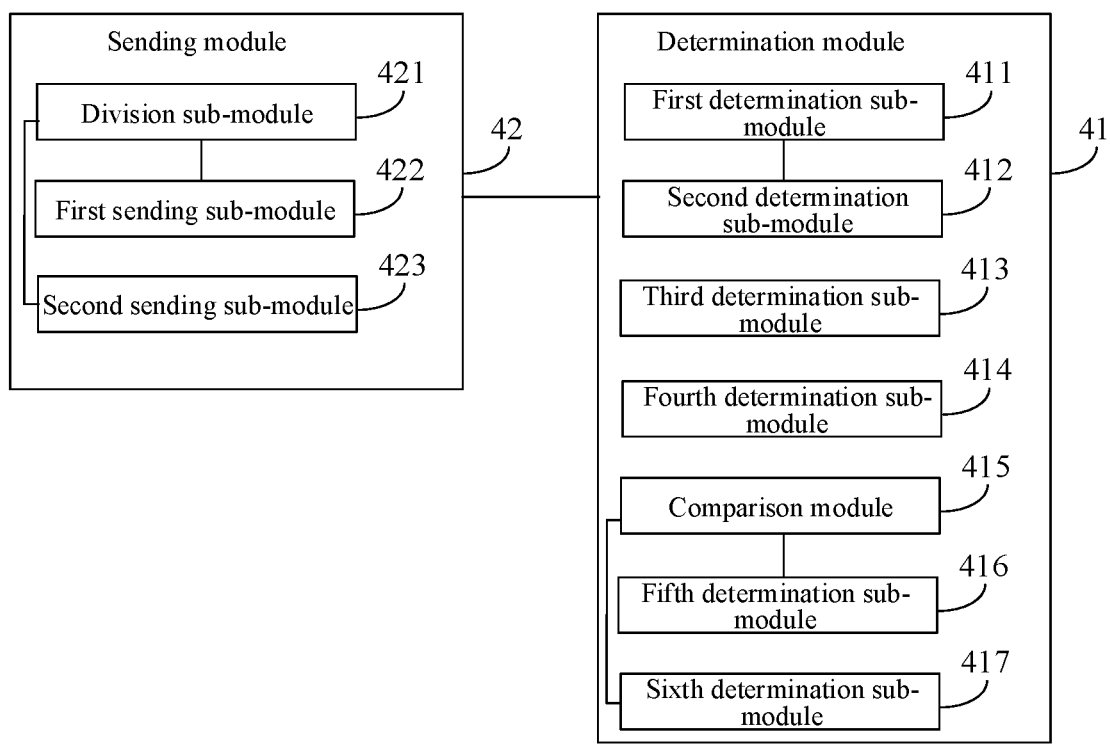
FIG. 5 is a block diagram of another data transmission apparatus according to some embodiments.

FIG. 5 is a block diagram of another data transmission apparatus according to some embodiments. As illustrated in FIG. 5, on the basis of the embodiment illustrated in FIG. 4, In some embodiments, the determination module 41 may include:

a first determination sub-module 411 configured to, in a case that the signal strength of the Wi-Fi network is higher than a first strength threshold, determine a first link corresponding to the Wi-Fi network as the transmission link;

a second determination sub-module 412 configured to, in a case that the signal strength of the Wi-Fi network is lower than the first strength threshold and higher than a second strength threshold, and the signal strength of the mobile network is higher than a third strength threshold and not higher than a fourth strength threshold, determine the first link corresponding to the Wi-Fi network and a second link corresponding to the mobile network as the transmission link;

a third determination sub-module 413 configured to, in a case that the signal strength of the Wi-Fi network is lower than the second strength threshold and the signal strength of the mobile network is higher than the fourth strength threshold, determine the second link corresponding to the mobile network as the transmission link.

In some embodiments, the first strength threshold, the second strength threshold, the third strength threshold and the fourth strength threshold may be set by a base station; or, the first strength threshold, the second strength threshold, the third strength threshold and the fourth strength threshold may be set by a UAV controller.

In some embodiments, the determination module 41 may further include:

a fourth determination sub-module 414 configured to, in a case that a volume of the data to be transmitted is greater than a first volume threshold, determine a first link corresponding to the Wi-Fi network and a second link corresponding to the mobile network as the transmission link;

a comparison sub-module 415 configured to, in a case that a volume of the data to be transmitted is not greater than the first volume threshold, compare the signal strength of the mobile network with the signal strength of the Wi-Fi network;

a fifth determination sub-module 416 configured to, in a case that the signal strength of the mobile network is higher than or equal to the signal strength of the Wi-Fi network, determine the second link corresponding to the mobile network as the transmission link;

a sixth determination sub-module 417 configured to, in a case that the signal strength of the mobile network is lower than the signal strength of the Wi-Fi network, determine the first link corresponding to the Wi-Fi network as the transmission link.

In some embodiments, the sending module may include:

a division sub-module 421 configured to, in a case that the first link corresponding to the Wi-Fi network and the second link corresponding to the mobile network are determined as the transmission link, divide the data to be transmitted into two groups of data according to a predetermined ratio;

a first sending sub-module 422 configured to send one of the two groups of data to the unmanned aerial vehicle controller through the first link;

a second sending sub-module 423 configured to send the other group of data to the base station through the second link to forward the other group of data by the base station to the UAV controller.

In some embodiments, the predetermined ratio may be set by the unmanned aerial vehicle controller.

With respect to the apparatus in the above embodiment, the specific manners for performing operations for individual modules therein have been described in detail in the embodiments regarding the method, which will not be elaborated herein.

Figure 6:
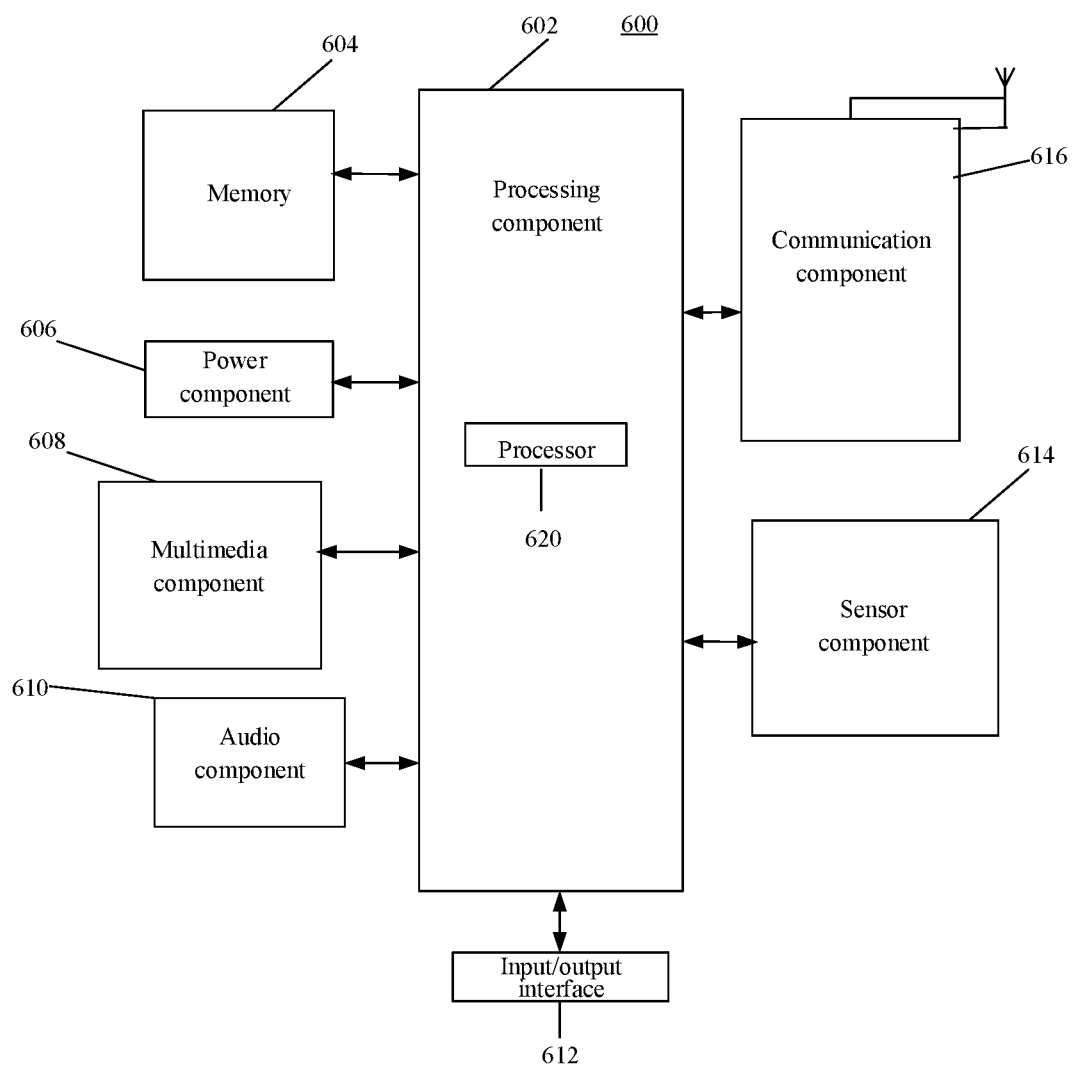
FIG. 6 is a block diagram of an apparatus applicable to data transmission according to some embodiments.

FIG. 6 is a block diagram of an apparatus applicable to data transmission according to some embodiments. For example, the apparatus 600 is a UAV.

Referring to FIG. 6, the apparatus 600 may include one or a plurality of following components: a processing component 602, a memory 604, a power component 606, a multimedia component 608, an audio component 610, an Input/Output (I/O) interface 612, a sensor component 614, and a communication component 616.

The processing component 602 is typically configured to control overall operations of the apparatus 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 606 is configured to provide power to various components of the apparatus 600. The power component 606 may include a power management system, one or more power sources, and any other components associated with the generation, management, and distribution of power in the apparatus 600.

The multimedia component 608 may include a screen providing an output interface between the apparatus 600 and the user. In some embodiments, the screen may include a Liquid Crystal Display (LCD) and a Touch Panel (TP). In some embodiments, an organic light-emitting diode (OLED) display can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive external multimedia data while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal in a case that the apparatus 600 is in an operation mode, such as a call mode, a recording mode and a voice recognition mode. The received audio signal may be further stored in the memory 604 or transmitted via the communication component 616. In some embodiments, the audio component 610 further includes a speaker to output audio signals.

The I/O interface 612 may provide an interface between the processing component 602 and peripheral interface modules, such as a keyboard, a click wheel and buttons. The buttons may include, but are not limited to, a home button, a volume button, a starting button, and a locking button.

The sensor component 614 may include one or more sensors to provide status assessments of various aspects of the apparatus 600. For example, the sensor component 614 may detect an open/closed status of the apparatus 600, relative positioning of components, e.g., the display and the keypad, of the apparatus 600, a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as WIFI, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the apparatus 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In exemplary embodiments, a non-temporary computer-readable storage medium including instructions, such as the memory 604 including instructions, executable by the processor 620 in the apparatus 600, for performing the above-described method. For example, the non-temporary computer-readable storage medium may be an ROM, a Random-Access Memory (RAM), a CD-ROM, a magnetic tape, a floppy disk, an optical data storage device, and the like.

The processor 620 may be configured to:

determine a transmission link for data to be transmitted based on signal strengths of a mobile network and a Wi-Fi network accessed by a UAV; and send the data to be transmitted through the transmission link.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for data transmission, comprising:
determining a transmission link for data to be transmitted based on signal strengths of a mobile network and a Wireless-Fidelity (Wi-Fi) network accessed by an unmanned aerial vehicle; and
sending the data to be transmitted through the transmission link,
wherein the sending the data to be transmitted through the transmission link comprises:
dividing the data to be transmitted into two groups of data according to a predetermined ratio, in a case that a first link corresponding to the Wi-Fi network and a second link corresponding to the mobile network are determined as the transmission link, wherein the data to be transmitted is divided by taking a bit as a unit, data represented by a first half bits of the data to be transmitted is divided into a first group of data, and data represented by a second half bits of the data to be transmitted is divided into a second group of data; and
sending one of the two groups of data to an unmanned aerial vehicle controller through the first link, and sending the other group of data to a base station through the second link to forward the other group of data by the base station to the unmanned aerial vehicle controller,
wherein the predetermined ratio is set by the unmanned aerial vehicle controller.

2. The method according to claim 1, wherein the determining the transmission link for the data to be transmitted based on the signal strengths of the mobile network and the Wi-Fi network accessed by the unmanned aerial vehicle comprises:
in a case that the signal strength of the Wi-Fi network is higher than a first strength threshold, determining the first link corresponding to the Wi-Fi network as the transmission link; or in a case that the signal strength of the Wi-Fi network is lower than a first strength threshold and higher than a second strength threshold, and the signal strength of the mobile network is higher than a third strength threshold and not higher than a fourth strength threshold, determining the first link corresponding to the Wi-Fi network and the second link corresponding to the mobile network as the transmission link; or in a case that the signal strength of the Wi-Fi network is lower than a second strength threshold and the signal strength of the mobile network is higher than a fourth strength threshold, determining the second link corresponding to the mobile network as the transmission link.

3. The method according to claim 2, wherein the first strength threshold, the second strength threshold, the third strength threshold and the fourth strength threshold are set by the base station; or, the first strength threshold, the second strength threshold, the third strength threshold and the fourth strength threshold are set by the unmanned aerial vehicle controller.

4. The method according to claim 1, wherein the determining the transmission link for the data to be transmitted based on the signal strengths of the mobile network and the Wi-Fi network accessed by the unmanned aerial vehicle further comprises:

in a case that a volume of the data to be transmitted is greater than a first volume threshold, determining the first link corresponding to the Wi-Fi network and the second link corresponding to the mobile network as the transmission link; or in a case that a volume of the data to be transmitted is not greater than a first volume threshold, comparing the signal strength of the mobile network with the signal strength of the Wi-Fi network;

in a case that the signal strength of the mobile network is higher than or equal to the signal strength of the Wi-Fi network, determining the second link corresponding to the mobile network as the transmission link; or in a case that the signal strength of the mobile network is lower than the signal strength of the Wi-Fi network, determining the first link corresponding to the Wi-Fi network as the transmission link.

5. An unmanned aerial vehicle (UAV) implementing the method of claim 1, wherein the mobile network and the Wi-Fi network accessed by the UAV are two independent communication networks;

the UAV is configured to dynamically adjust, based on the signal strengths of the mobile network and Wi-Fi network accessed by the UAV, the transmission link for the data to be transmitted, thereby integrating resources of the mobile network and the Wi-Fi network accessed by the UAV, and improving data transmission performance.

6. An apparatus for data transmission, comprising:
a processing component, and
a communication component, connected with the processing component and configured to send and receive information under control of the processing component,
wherein the processing component is configured to:
determine, based on signal strengths of a mobile network and a Wi-Fi network accessed by an unmanned aerial vehicle, a transmission link for data to be transmitted; and control the communication component to send the data to be transmitted through the transmission link;
wherein the processing component is further configured to:
in a case that a first link corresponding to the Wi-Fi network and a second link corresponding to the mobile network are determined as the transmission link, divide the data to be transmitted into two groups of data according to a predetermined ratio,. wherein the data to be transmitted is divided by taking a bit as a unit, data represented by a first half bits of the data to be transmitted is divided into a first group of data, and data represented by a second half bits of the data to be transmitted is divided into a second group of data;
control the communication component to send one of the two groups of data to an unmanned aerial vehicle controller through the first link; and
control the communication component to send the other group of data to a base station through the second link to forward the other group of data by the base station to the unmanned aerial vehicle controller,
wherein the predetermined ratio is set by the unmanned aerial vehicle controller.

7. The apparatus according to claim 6, wherein the processing component is further configured to:
in a case that the signal strength of the Wi-Fi network is higher than a first strength threshold, determine the first link corresponding to the Wi-Fi network as the transmission link;
in a case that the signal strength of the Wi-Fi network is lower than the first strength threshold and higher than a second strength threshold and the signal strength of the mobile network is higher than a third strength threshold and not higher than a fourth strength threshold, determine the first link corresponding to the Wi-Fi network and the second link corresponding to the mobile network as the transmission link; and
in a case that the signal strength of the Wi-Fi network is lower than the second strength threshold and the signal strength of the mobile network is higher than the fourth strength threshold, determine the second link corresponding to the mobile network as the transmission link.

8. The apparatus according to claim 7, wherein the first strength threshold, the second strength threshold, the third strength threshold and the fourth strength threshold are set by the base station; or, the first strength threshold, the second strength threshold, the third strength threshold and the fourth strength threshold are set by the unmanned aerial vehicle controller.

9. The apparatus according to claim 6, wherein the processing component is further configured to:
in a case that a volume of the data to be transmitted is greater than a first volume threshold, determine the first link corresponding to the Wi-Fi network and the second link corresponding to the mobile network as the transmission link;
in a case that the volume of the data to be transmitted is not greater than the first volume threshold, compare the signal strength of the mobile network with the signal strength of the Wi-Fi network;
in a case that the signal strength of the mobile network is higher than or equal to the signal strength of the Wi-Fi network, determine the second link corresponding to the mobile network as the transmission link; and in a case that the signal strength of the mobile network is lower than the signal strength of the Wi-Fi network, determine the first link corresponding to the Wi-Fi network as the transmission link.

10. A non-transitory computer-readable storage medium, having computer instructions stored thereon that, when executed by a processor, implement operations of:
determining a transmission link for data to be transmitted based on signal strengths of a mobile network and a Wi-Fi network accessed by an unmanned aerial vehicle; and
sending the data to be transmitted through the transmission link,
wherein the sending the data to be transmitted through the transmission link comprises:
dividing the data to be transmitted into two groups of data according to a predetermined ratio, in a case that a first link corresponding to the Wi-Fi network and a second link corresponding to the mobile network are determined as the transmission link, wherein the data to be transmitted is divided by taking a bit as a unit, data represented by a first half bits of the data to be transmitted is divided into a first group of data, and data represented by a second half bits of the data to be transmitted is divided into a second group of data; and
sending one of the two groups of data to an unmanned aerial vehicle controller through the first link, and sending the other group of data to a base station through the second link to forward the other group of data by the base station to the unmanned aerial vehicle controller,
wherein the predetermined ratio is set by the unmanned aerial vehicle controller.

11. The non-transitory computer-readable storage medium according to claim 10, wherein the processor is further configured to:
in a case that the signal strength of the Wi-Fi network is higher than a first strength threshold, determine the first link corresponding to the Wi-Fi network as the transmission link;
in a case that the signal strength of the Wi-Fi network is lower than the first strength threshold and higher than a second strength threshold and the signal strength of the mobile network is higher than a third strength threshold and not higher than a fourth strength threshold, determine the first link corresponding to the Wi-Fi network and the second link corresponding to the mobile network as the transmission link; and
in a case that the signal strength of the Wi-Fi network is lower than the second strength threshold and the signal strength of the mobile network is higher than the fourth strength threshold, determine the second link corresponding to the mobile network as the transmission link; wherein
the first strength threshold, the second strength threshold, the third strength threshold and the fourth strength threshold are set by the base station; or,
the first strength threshold, the second strength threshold, the third strength threshold and the fourth strength threshold are set by the unmanned aerial vehicle controller.

12. The non-transitory computer-readable storage medium according to claim 10, wherein the processor is further configured to:
in a case that a volume of the data to be transmitted is greater than a first volume threshold, determine the first link corresponding to the Wi-Fi network and the second link corresponding to the mobile network as the transmission link;
in a case that the volume of the data to be transmitted is not greater than the first volume threshold, compare the signal strength of the mobile network with the signal strength of the Wi-Fi network;
in a case that the signal strength of the mobile network is higher than or equal to the signal strength of the Wi-Fi network, determine the second link corresponding to the mobile network as the transmission link; and
in a case that the signal strength of the mobile network is lower than the signal strength of the Wi-Fi network, determine the first link corresponding to the Wi-Fi network as the transmission link.

* * * * *